United States Patent [19]
Telewski

[11] Patent Number: 6,021,315
[45] Date of Patent: Feb. 1, 2000

[54] SYSTEM AND METHOD FOR TESTING OF WIRELESS COMMUNICATION DEVICES

[75] Inventor: Frederick J. Telewski, Woodinville, Wash.

[73] Assignee: Cellular Technical Services Co., Inc., Seattle, Wash.

[21] Appl. No.: 08/974,563

[22] Filed: Nov. 19, 1997

[51] Int. Cl.$^7$ ............................... H04Q 7/20; G01R 1/24
[52] U.S. Cl. ...................... 455/67.1; 455/67.1; 455/67.2; 455/67.4; 343/703
[58] Field of Search ................................ 455/67.1, 67.4, 455/115, 118, 90, 575, 67.2, 423; 343/702, 703; 342/360; 324/627, 628

[56] References Cited

U.S. PATENT DOCUMENTS

| | | | |
|---|---|---|---|
| 3,273,150 | 9/1966 | Emerson | 455/67 |
| 5,300,939 | 4/1994 | Maeda et al. | 343/703 |
| 5,585,808 | 12/1996 | Wysome | 343/703 |

OTHER PUBLICATIONS

The Semi–Open Anechoic Chamber (K.A.KOOB and B.H.C. LIESENKOTTER; Messerschmitt–Blohm Gmbh, Germany), Jun. 30, 1978.

*Primary Examiner*—David R. Hudspeth
*Assistant Examiner*—Meless Zewdu
*Attorney, Agent, or Firm*—Seed and Berry LLP

[57] ABSTRACT

A system and method for testing wireless communication devices uses a waveguide designed for operation beyond cutoff for frequencies used by the wireless communication device to be tested. The waveguide has first and second ends with at least an opened first end to permit the easy insertion and removal of the wireless communication device. An antenna located within the waveguide and coupled to an external test system permits wireless communication between the external test system and the wireless communication device when inserted in the waveguide. Radio frequency (RF) signals propagate between the antenna located within the waveguide and the wireless communication device when inserted into the waveguide. The length of the waveguide is designed to provide sufficient attenuation of RF transmissions when measured at the opened end of the waveguide. The opened end of the waveguide advantageously permits the easy insertion and extraction of a wireless communication device while the waveguide dimensions prevent the leakage of RF signals into and out of the waveguide. The external test equipment includes a transmitter and receiver that are designed to operate at frequencies used by the wireless communication device. The system may be used to collect data to analyze the wireless communication device or to collect transmission characteristics to be used to establish a fingerprint for subsequent identification of the wireless communication device. The external test system may operate under control of a processor or a central computer system. Data collected by the external test system may be analyzed by the processor or the central computer system.

47 Claims, 7 Drawing Sheets

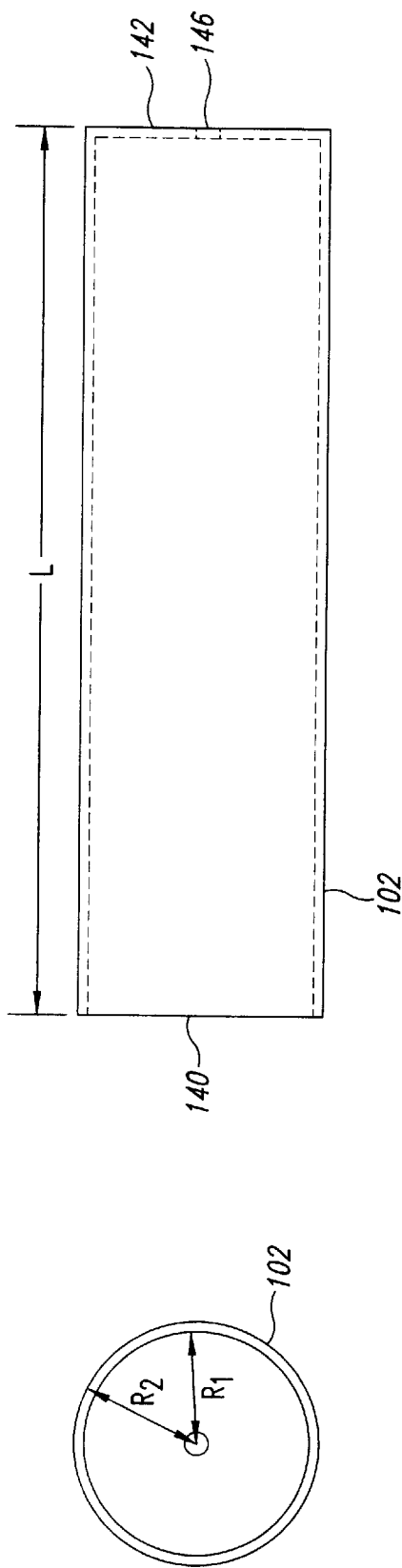

SYSTEM AND METHOD FOR TESTING OF WIRELESS COMMUNICATION DEVICES

TECHNICAL FIELD

The present invention relates generally to wireless communication devices, and, more particularly, to a system and method for testing wireless communication devices.

BACKGROUND OF THE INVENTION

Wireless communications, especially using cellular telephone technology, is commonly used throughout the world. Advances in wireless communication technology, such as personal communication systems (PCS) and wireless communication devices, combine voice communication, data communication, paging, and the like, in a single wireless communication device.

A large number of companies manufacture wireless communication devices and offer a broad array of features and frequency ranges. For example, analog and digital cellular telephone communications typically operate in the 800 megahertz (MHz) region. In contrast, PCS devices typically operate in the 1800 MHz region.

Operational testing of any wireless communication device is highly desirable. For quality control, and to assure regulatory compliance, manufacturers need to check the operation of wireless communication devices. While testing can be performed on portions of the circuit during the manufacturing process, it is desirable to test the completed product to assure proper system operation.

To perform the desired testing and analysis, manufacturers sometimes use a radio frequency (RF) test apparatus 2 as shown in FIG. 1. The test apparatus 2 is typically in the form of a box 4 that defines an RF sealed enclosure 4a. A door 6 permits access to the RF enclosure 4a. A door seal 6a provides protection against RF leakage when the door 6 is closed. In operation, a wireless communication device 10 is placed in the RF enclosure 4a and the door 6 is latched so that the door is sealed against the box 4 by the door seal 6a. External equipment (not shown), such as a transmitter and receiver, communicate with the wireless communication device 10 while in the box 4 via an antenna (not shown) within the RF enclosure 4a. Alternatively, a cable (not shown) may be passed through the boxwall and connected directly to, and control, the wireless communication device 10.

The test apparatus 2 must be constructed from metallic materials that are designed to be impervious to RF radiation in the frequency range used by the wireless communication device 10. The test apparatus 2 is generally very heavy and cumbersome, and is generally very expensive to manufacture. Furthermore, the door 6 is always a source of potential RF leakage. While the door seal 6a may provide some protection against RF leakage, the door seal is prone to damage and may become ineffective with prolonged use. Using a door seal adds extra cost.

The test apparatus 2 is not suitable for use in a large scale production environment because the door 6 must be opened and sealed to test each wireless communication device 10. Thus, the test apparatus 2 is unacceptable for use in a mass production environment where it may be desirable to quickly test many wireless communication devices. Therefore, it can be appreciated that there is a significant need for a cost effective and efficient system and method for testing wireless communication devices. The present invention provides this and other advantages as will be illustrated by the following description and accompanying figures.

SUMMARY OF THE INVENTION

The present invention is embodied in a system for testing a wireless communication device and includes a waveguide with an interior portion sized to accept the wireless communication device. The waveguide has physical dimensions to assure waveguide operation beyond cutoff at frequencies used for communication with the wireless communication device. The system also includes a system communication device, capable of operating at frequencies used for communication with the wireless communication device, and a signal coupler coupled between the system communication device and the waveguide interior portion to communicate with the wireless communication device when in the interior portion.

The system communication device may be a transmitter and receiver capable of operating at frequencies used for communication with the wireless communication device. An antenna coupled to the transmitter and receiver and extending into the waveguide interior portion radiates the radio frequency signals transmitted by the transmitter for reception by the wireless communication device when in the waveguide and receives radio frequency signals emanating from the wireless communication device when in the waveguide. The antenna couples the received radio signals to the receiver.

Alternatively, the system communication device may be a signal generator connected directly to the wireless communication device via a signal cable to permit communication with the wireless communication device when in the waveguide interior portion.

The system may further include a processor to control the system communication device. The processor can control the transmitter and receiver, or the signal generator.

The waveguide may be a circular waveguide with a radius and length selected to assure waveguide operation beyond cutoff at frequencies used for communication with the wireless communication device and to thereby attenuate radio frequency signals at such frequencies by a predetermined amount. Alternatively, the waveguide may be rectangular in shape having a height, width and length selected to assure waveguide operation beyond cutoff at frequencies used for communication with the wireless communication device.

The waveguide interior portion has an active area where radio frequency signals at frequencies used for communication with the wireless communication device propagate and an inactive area where radio frequency signals at such frequencies do not propagate. When a transmitter and receiver are used to communicate with the wireless communication device, an antenna is located within the active area in the interior portion of the waveguide. Alternatively, the system communication device may be directly coupled to the wireless communication device in the active area.

The waveguide has first and second ends and may have the first end open and the second end closed. Alternatively, the first and second ends of the waveguide may both be open. In this embodiment, the waveguide can have a waveguide length that is approximately two times that required to assure waveguide operation beyond cutoff at frequencies used for communication with the wireless communication device. The antenna is located in the interior portion of the open ended waveguide in substantially the middle portion to permit communications with the wireless communication device when in the interior portion of the waveguide. A conveyor assembly may automatically transport wireless communication devices to a central portion of the open ended waveguide so that the wireless communication device is positioned substantially in the middle portion of the open ended waveguide for testing.

The data collected from the wireless communication device may be used to generate fingerprint data associated with transmission characteristics of the wireless communication device. The processor may store the fingerprints for subsequent use in authentication of the wireless communication device when used outside the waveguide. Alternatively, an external computer coupled to the processor may receive and store the fingerprint data associated with the transmission characteristic of the wireless communication device.

BRIEF DESCRIPTION OF THE DRAWINGS

FIG. 4A is a cross-sectional view of one embodiment of the waveguide of the system of FIG. 3.

FIG. 4B is a side view of the waveguide of FIG. 4A.

FIG. 4C is a fragmentary side view of the waveguide of FIG. 4A illustrating the placement of a wireless communication device within the waveguide.

DETAILED DESCRIPTION OF THE INVENTION

Figure 1:
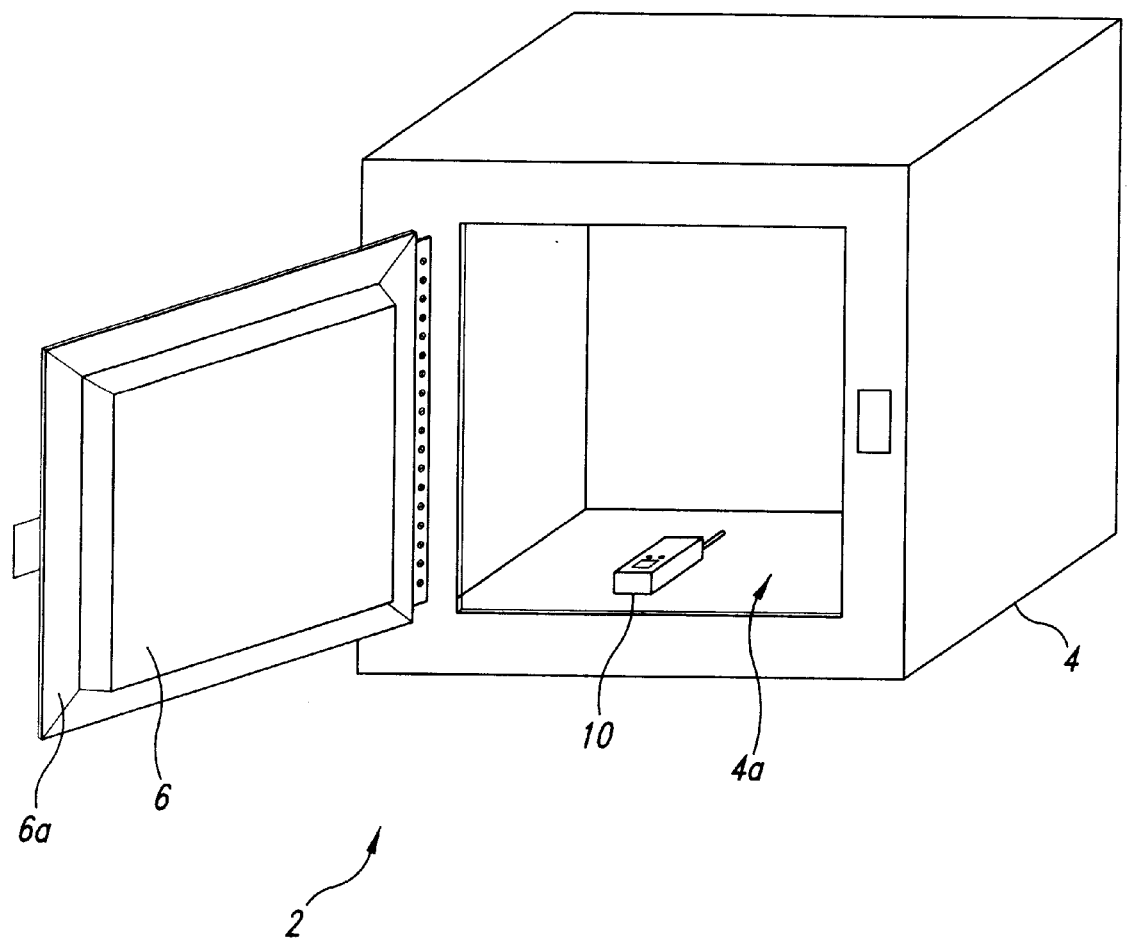
FIG. 1 illustrates a conventional radio frequency testing apparatus.

The present invention is directed to a system and method for testing wireless communication devices. To assist in the understanding of the present invention, a brief description of a typical wireless communication will be provided. A conventional wireless communication device 10 is illustrated in the functional block diagram of FIG. 2. An antenna 12 is coupled to a transmitter 16 and a receiver 18. The transmitter 16 and receiver 18 may share some circuit components and be considered a transceiver. The transmitter 16 and receive 18 operate at frequencies that are assigned for various types of wireless communication devices.

A microphone 20 and speaker 22 provide audio input and output, respectively. The wireless communication device 10 includes a power supply 26, which includes a battery (not shown) for internal power and a power supply connector 28 for the supply of external power. The typical wireless communication device 10, such as a handheld cellular telephone, also includes a central processing unit (CPU) 30, which may be an embedded controller, conventional microprocessor, or the like. In addition, the wireless communication device 10 includes a memory 32, which may include both random access memory (RAM) and read-only memory (ROM). A keypad 34 is selectively operated by the user to control the wireless communication device. A keypad connector 36 permits remote operation of the wireless communication device 10 by accepting signals in place of keypad button activation by the user. A display 38 provides the user with information regarding the operation of the wireless communication device 10. The complexity of the display 38 depends on the type of wireless communication device. For example, the display 38 may simply comprise status lights such as when the communications device 10 is a two-way radio. However, the display 38 may be as complex as a screen display with alphanumeric characters, as is common on a cellular telephone. The various components described above are coupled together by a bus 40. For the sake of clarity, the bus 40 is illustrated as coupling all components together. However, those skilled in the art will recognize that some components, such as the microphone 20 and the speaker 22 are analog components while the CPU 30 and memory 32 are digital components. Thus, the bus 40 represents both the analog and digital interconnection of components. The operation of such conventional wireless communication devices are well known in the art and thus will only be described in the context of the present invention.

Figure 3:
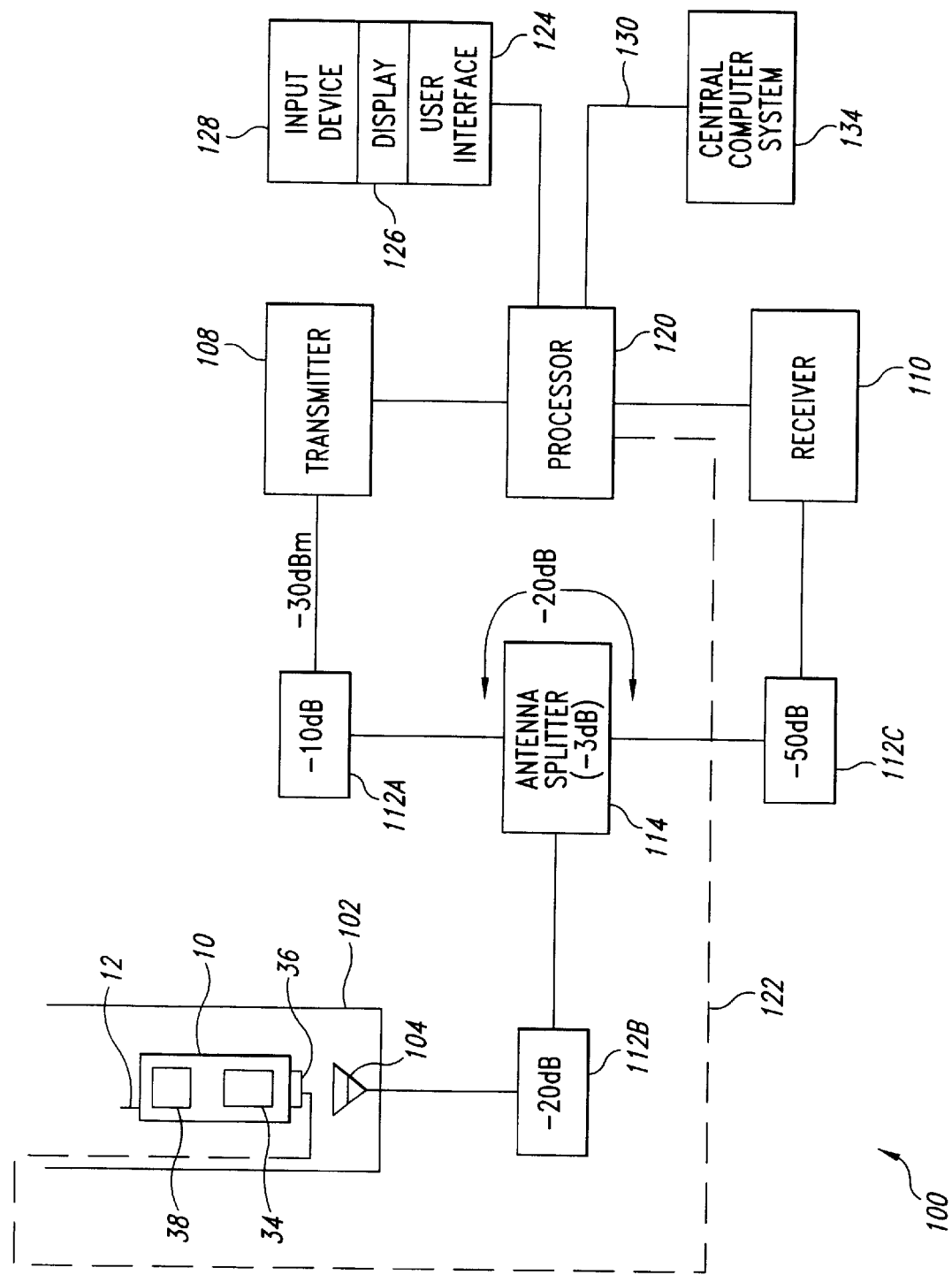
FIG. 3 is a functional block diagram of the system of the present invention.

The present invention is embodied in a system 100, illustrated in the functional block diagram of FIG. 3. The system includes a waveguide 102 that is sized to receive the wireless communication device 10. The waveguide 102 is designed to assure operation beyond "cutoff" for frequencies used by the wireless communication device. A waveguide can be fashioned from any piece of conductive tubing and serves to conduct electromagnetic energy from a first end of the wave guide to a second end of the wave guide. Operation beyond cutoff refers to a waveguide with a sufficiently small cross-sectional area that will not conduct electromagnetic energy at wavelengths longer than a selected wavelength. The waveguide beyond cutoff may be considered a distributed high pass filter with excellent cutoff properties. With a sufficiently large cross-sectional area, virtually all RF wavelengths will propagate from the waveguide first end to the waveguide second end. As the cross-sectional area of the waveguide is decreased, longer wavelength signals will no longer propagate from the first end to the second end. These signals have frequencies that are effectively beyond the cutoff point for the particular cross-sectional area of the waveguide. As the cross-sectional area of the waveguide decreases, the maximum wavelength propagating through the waveguide also decreases. If wavelengths longer than the cutoff wavelength are introduced into the waveguide first end, they do not propagate to the waveguide second end, but are attenuated along the length of the waveguide. The waveguide 102 used by the system 100 is designed to have a cross-sectional area that prevents propagation of RF signals for frequencies used by the wireless communication device 10. When the wireless communication device 10 is inserted within an interior portion of the waveguide 102 away from the opening, the wireless communication device is shielded from sources of RF radiation that are outside of the waveguide. Similarly, RF signals transmitted from the wireless communication device are prevented from leaking outside the waveguide 102. With the proper selection of cross-sectional area and length of the waveguide, it is possible to achieve a significant degree of isolation of RF signals from the interior portion of the waveguide near the waveguide first end and the waveguide second end. Thus, the waveguide 102 effectively functions as an RF test chamber. The waveguide 102 can provide a degree of RF isolation that meets or exceeds that of the RF test apparatus 2 (see FIG. 1) at a significantly lower cost. In addition, the waveguide 102 does not require a door 6 or a door seal 6a, such as required by the conventional RF test apparatus 2.

The open end of the waveguide 102 also permits the easy insertion and extraction of the wireless communication device 10 since no door is required to provide adequate RF isolation. Details of the waveguide 102 are provided below.

An antenna 104 is positioned within the interior portion of the waveguide 102 in proximity with the wireless communication device 10. The antenna 104 is coupled to an externally located transmitter 108 and receiver 110. The transmitter 108 transmits radio frequency signals to the wireless communication device 10 within the waveguide 102 via the antenna 104. The receiver 110 receives radio frequency signals from the wireless communication device within the waveguide that are detected by the antenna 104.

The antenna 104 is coupled to the transmitter 108 and receiver 110 through a series of RF attenuators 112A–C and an antenna splitter 114. Alternatively, separate transmit and receive antennae may be used and the antenna splitter 114 eliminated. The attenuators are designed to attenuate the RF signals to assure operation within the dynamic range of the transmitter 108 and receiver 110 in the system 100, as well as the transmitter 16 and receiver 18 of the wireless communication device 10 (see FIG. 2). The attenuators 112A–C are conventional RF components and need not be described in greater detail. The antenna splitter 114 is designed to couple the antenna 104 to both the transmitter 108 and receiver 110. The antenna splitter 114 has a 3 decibel (dB) insertion loss and provides 20 dB of isolation between the transmitter 108 and the receiver 110. In an exemplary embodiment, the transmitter 108 is configured to transmit signals at –30 dBm. A –10 dB attenuator 112A is connected between the transmitter 108 and the antenna splitter 114 and a –20 dB attenuator 112B is connected between the antenna splitter 114 and the system 104. The attenuators 112A–B, combined with the –3 dB insertion loss from the antenna splitter 114 alternate the transmit signal of the transmitter by 33 dB. Thus, the transmitted signal at the antenna 104 has a signal level of –63 dBm. This signal level assures proper operation if the wireless communication device 10 is a cellular telephone. Those skilled in the art will recognize that the attenuators 112A and B and the signal level of the transmitter 108 can be readily adjusted to provide appropriate signal levels for other forms of the wireless communication device 10.

Radio frequency signals transmitted from the wireless communication device 10 are detected by the antenna 104. The detected RF signals are attenuated by the –20 dB attenuator 112B, the antenna splitter 114 (–3 dB insertion loss), and a –50 dB attenuator 112C connected between the antenna splitter 114 and the receiver 110. Thus, the signal at the input of the receiver 110 has been attenuated by 73 dB. Of course, the actual signal level at the input of the receiver 110 depends on the output signal level from the transmitter 16 (see FIG. 2) of the wireless communication device 10. If the wireless communication device 10 is a cellular telephone, the typical output power range varies from +8 dBm to +28 dBm. Thus, the signal at the input of the receiver 110 varies from approximately –65 dBm to –45 dBm, depending on the output of the transmitter 16. The receiver 110 operates satisfactorily with an input signal in this range. However, those of ordinary skill in the art will recognize that the attenuators 112B and C may be adjusted to operate satisfactorily with the particular transmitter 16 of the wireless communication device 10 and the receiver 110.

The circuit arrangement illustrated in FIG. 3 also provides isolation between the transmitter 108 and the receiver 110 to prevent signals from the transmitter 108 from leaking into the receiver 110. As previously discussed, the antenna splitter 114 provides 20 dB of isolation between the input from the transmitter 108 and the input of the receiver 110. The signal from the transmitter 108, which is at –30 dBm, is attenuated by the –10 dB attenuator 112A, the –50 dB attenuator 112C and the 20 dB of isolation provided by the antenna splitter 114. Thus, the leakage signal present at the input of the receiver 110 due to the transmitter 108 is at a signal level of –110 dBm. This provides acceptable isolation between the transmitter 108 and the receiver 110.

The transmitter 108 and the receiver 110 are controlled by a processor 120. The processor 120 includes the typical components of a conventional microcomputer, such as a CPU and a memory, which are omitted here for the sake of brevity. The processor 120 is coupled to the transmitter 108 and the receiver 110 to control their operation. For example, the processor 120 provides the transmitter 108 with data to be transmitted to the wireless communication device 10 in the waveguide 102. In addition, the processor 120 controls the selection of transmitter operating parameters, such as the carrier frequency and transmitted power output of the transmitter 108. The processor 120 may also send commands to the wireless communication device 10 within the waveguide 102 to control the transmitter 16 and receiver 18 (see FIG. 2). Similarly, the processor 120 receives data in the form of a receiver output signal generated by the receiver 110 in response to RF signals received from the wireless communication device 10 while in the waveguide 102. In addition, the processor 120 controls the selection of receiver operating parameters, such as the carrier frequency and gain of the receiver 110.

A user interface 124 is also coupled to the processor 120. The user interface 124 typically includes a display 126 and a user input device 128. As will be discussed in detail below, the complexity of the user interface depends on the particular features incorporated into the system 100. In a simplified and totally automated system 100, the user interface 124 may be quite simple. For example, the display 126 may simply includes lights to indicate the status of the system. The user input device 128 may simply be a "Start" button. However, in a more complex embodiment of the system 100, the display 126 is a conventional video display, while the user input device 128 is a keyboard or touch-sensitive screen. The user input device 128 may also include a cursor control device, such as a mouse or trackball, operating in conjunction with the keyboard. The present invention is not limited by the particular configuration of the user interface 124.

The processor 120 may also communicate directly with the wireless communication device 10 using a cable 122 coupled between the processor and the keypad connector 36. The optional cable 122 may be a fiber optic cable, wireless infrared connection, or the like. This implementation is particularly useful for initial programming of the wireless communication device, as will be described in detail below. The cable 122 is illustrated as entering an opened end of the waveguide 102. This arrangement minimizes RF leakage that may result from additional holes being drilled into the waveguide itself. A wire cable is not recommended for the optional cable 122 due to the potential for increased RF leakage via the wire cable itself.

The processor 120 also includes a data link 130 to couple the processor to a central computer system 134. The data link 130 may be a hard-wired connection, dedicated telephone line, a network connection or the like. The present invention is not limited by the specific form of the data link 130. The central computer system 134 can be used to process data from the processor 120. This includes test data collected from the wireless communication device 10 while in the waveguide 102. In addition, as will be discussed in greater detail below, transmission characteristics may be collected from the wireless communication device 10 to form a "fingerprint" that may be used to identify the wireless communication device at a subsequent time. The transmission characteristics may be analyzed by the processor 120 to develop the fingerprint for the wireless communication device 10 in the waveguide 102. The central computer system can store the fingerprint for subsequent use in authenticating the wireless communication device. Alternatively, the data collected by the processor 120 may be relayed to the central computer system 134 via the data link 130 for analysis and development of the fingerprint by the central computer system.

With the various system components having been briefly described, the design and operation of the waveguide 102 will now be described in greater detail. A conventional waveguide is a conducting tube or enclosed space through which energy is transmitted in the form of electromagnetic waves. The waveguide is not considered as carrying a current as a typical conductor, but rather as a boundary which confines the electromagnetic waves to the enclosed space. As is known in the art, skin effects prevent any of the electromagnetic effects being detected outside the waveguide. The energy is injected into the waveguide at a first end in a well known manner, such as through capacitive or inductive coupling or by radiation, and is received at the other end of the waveguide. The waveguide merely confines the electromagnetic energy of the fields, which are propagated through it to a second receiving end of the waveguide by means of reflections against the inner walls of the waveguide.

The conventional waveguide is designed so that electromagnetic energy propagates from the first end of the waveguide to the second end of the waveguide (i.e., a propagation mode). The length of the conventional waveguide is based on the lowest frequency to be transmitted within the waveguide. This is referred to as the dominant mode. Thus, the length of the conventional waveguide is determined with respect to the other dimensions of the waveguide and the lowest frequency to be transmitted.

In contrast to waveguide operation in the dominant mode, the waveguide 102 of the present invention has physical dimensions that are designed to assure operation beyond cutoff. Operation beyond cutoff refers to the fact that the waveguide 102 is selected with sufficient length with respect to the wavelength of signals transmitted and received by the system 100 that the RF signal is no longer propagating from the first end of the waveguide to the second end of the waveguide, but is significantly attenuated at the second end of the waveguide. With operation beyond cutoff, the waveguide 102 is said to be operating in a non-propagation mode, or an evanescent mode.

One embodiment of the waveguide 102 is illustrated in FIGS. 4A–4C. The waveguide 102 shown in FIGS. 4A–4C is a circular waveguide having an inner radius $R_1$ that is approximately one quarter of the wavelength of the frequency used for communication with the wireless communication device 10 (see FIG. 3) when in the waveguide 102, and an outer radius $R_2$ that depends on the thickness of material of the waveguide wall. For example, a tube radius $(R_1)$ of approximately three inches can be used for radio frequency communication in the 900 MHz band. The waveguide 102 may be readily constructed from any metal, such as aluminum, copper, stainless steel, or the like. In an exemplary embodiment, the circular waveguide 102 is constructed from one quarter inch thick aluminum pipe.

Rather than being signed for operation in the dominant mode, the length of the waveguide 102 is selected to be longer than the cutoff wavelength for a given frequency. As shown in FIG. 4B, the waveguide 102 has a length L, and is open at a first end 140 and closed at a second end 142. It should be noted that the length L is significantly longer than that of the conventional waveguide such that the signal transmitted from the antenna 104 into the waveguide 102, or from the antenna 12 of the wireless communication device 10 within the waveguide, only propagates in an active portion of the waveguide near the closed second end 142. Beyond the active portion, the signal is no longer in a propagation mode, but a non-propagation or evanescent mode. As such, in accordance with the principles of the present invention, it is possible to achieve significant attenuation of the radiated RF signal transmitted within the waveguide 102 by increasing the length L of the waveguide 102. It should be noted that the length L of the waveguide 102 must be considered with respect to the actual position of the antenna 104. In the embodiment illustrated in FIGS. 4A–C, the antenna 104 is mounted in the waveguide 102 at the closed second end 142. However, the antenna 104 can be readily mounted in the side wall of the waveguide 102. The length L of the waveguide 102 can be readily calculated with respect to the location of the antenna 104 within the waveguide. In accordance with well known principles of radio communication, approximately 54 dB of attenuation is achieved per waveguide cutoff length, which is approximately 2 diameters of length.

In the embodiment illustrated in FIGS. 4A–4C, the second end 142 of the waveguide 102 is sealed by an aluminum disc that is attached through a conventional heliarc welding process to provide a continuous metal surface on the interior side portion and closed second end 142 of the waveguide 102. The closed second end 142 of the waveguide 102 provides a reflective surface for the electromagnetic waves from the antenna 104. The second end 142 contains a through aperture 146 to permit the insertion of the antenna 104 into the interior portion of the waveguide as illustrated in FIG. 4C. The antenna 104 may be sized to be retained within the aperture 146 by compressive forces. Alternatively, a conventional connector, such as an SMC connector (not shown) may be used to couple the antenna 104 to the transmitter 108 and receiver 110.

In an exemplary embodiment, the internal radius $R_1$ of the circular waveguide 102 is 4.5 inches and the length L of the waveguide is 24 inches. These dimensions produce approximately 78 dB of attenuation of radio frequency signals at 900 MHz transmitted from the second end 142 to the first end 140 of the waveguide 102. It should be noted that the length L of the waveguide 102 can be increased to provide additional attenuation if necessary. The use of the waveguide 102 is a significant improvement over the use of the conventional test apparatus 2 (see FIG. 1) using a box RF enclosure 4a with a sealed door 6 in that RF leakage can be precisely controlled by the design of the waveguide (and a convenient open first end 140 allows convenient access to the waveguide interior without significant RF leakage and without the cost of a door. In contrast, the conventional test apparatus 2 must rely on the door 6 and door seal 6a to provide adequate RF shielding. Any damage to the door seal 6a results in unpredictable RF leakage and unsatisfactory operation of test equipment. Thus, the present invention provides a significant improvement over the existing technology.

As noted, in addition to improved reliability, the constantly open first end 140 of the waveguide 102 provides easy access to the interior portion of the waveguide without the need for a door or other closure. As illustrated in FIG. 4C, the wireless communication device 10 is inserted through the open first end 140 into the interior portion of the waveguide 102 to a position near the second end 142. An insertion tool 150 may be used to provide consistent placement of the wireless communication device 10 within the interior of the waveguide 102. The insertion tool 150 may remain within the waveguide 102 during usage if made of any nonconductive material, such as plastic. The insertion tool 150 has a cradle portion 152 which is sized to receive and carry the wireless communication device 10. The insertion tool 150 includes an end portion 154 that extends beyond the cradle 152. The end portion 154 is designed to make physical contact with the waveguide interior wall at the second end 142 of the waveguide 102 thus repeatedly positioning subsequently inserted wireless communication devices in a consistent location within the interior of the waveguide in proximity with the antenna 104. The end portion 154 is also sized to prevent physical contact between the antenna 12 and the waveguide 102. Alternatively, the insertion tool 150 may include a position mark 156 to indicate to the user the depth to which the insertion tool should be inserted within the waveguide 102 to properly position the wireless communication device 10 within the waveguide.

When the wireless communication device 10 is inserted within the waveguide 102 and positioned at the second end 142 of the waveguide, the RF signal propagates near the second end 142. However, due to the design of the waveguide 102, the RF signal is greatly attenuated so that RF signal at the first end 140 of the waveguide 102 is reduced to an acceptable level.

Figure 5A:
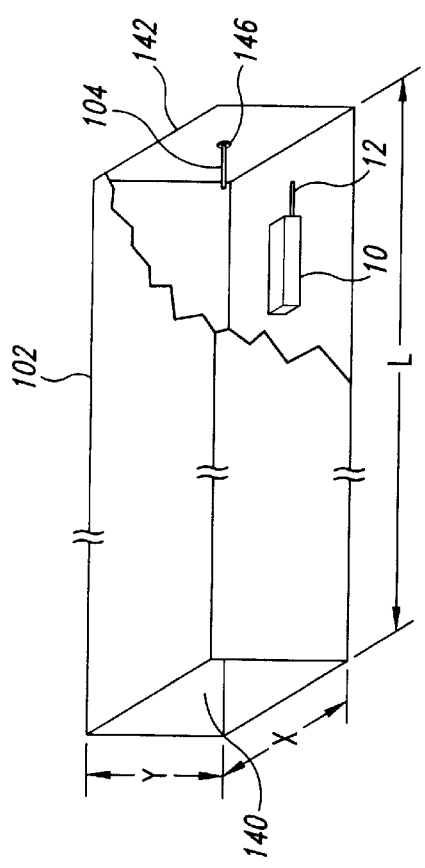
FIG. 5A is a fragmentary perspective view of an alternative embodiment of the waveguide of FIG. 3 illustrating the placement of the wireless communication device within the waveguide.

While FIGS. 4A–4C illustrate the waveguide 102 of the present invention as a circular waveguide, the waveguide may have other shapes as well. In FIG. 5A, the waveguide 102 is illustrated as a rectangular waveguide having the first end 140 open and the second end 142 closed. The width X and height Y dimensions of the rectangular waveguide are determined in a conventional fashion based on the frequency used by the wireless communication device 10. In practice, the dimension Y is typically equal to about ½ X in order to avoid the possibility of operation in other propagation modes. As previously discussed, the waveguide 102 is designed to assure operation beyond cutoff. The length L of the rectangular waveguide 102, illustrated in FIG. 5A, is designed to be greater than the cutoff wavelength and thus assure significant attenuation of the RF signal at the open first end 140 of the rectangular waveguide 102. The closed second end 142 of the alternative embodiment of the waveguide 102 contains the aperture 146 sized to receive the antenna 104. Operation of the system 100 using the rectangular embodiment of the waveguide 102 shown in FIG. 5A is fundamentally identical to that of the system using the circular embodiment of the waveguide shown in FIGS. 4A–4C and need not be discussed in greater detail herein.

Alternatively, the waveguide 102 may have an elliptical or triangular cross-section. The waveguide 102 may have virtually any form of polygon for a cross-sectional area. Those skilled in the art will recognize that certain cross-sectional shapes may be easier to manufacture and are thus more desirable. For example, the circular waveguide, illustrated in FIGS. 4A–4C, is readily available and provides a low cost implementation of the system 100. However, it should be clear that the present invention is not limited by the specific cross-sectional shape of the waveguide 102.

Figure 5B:
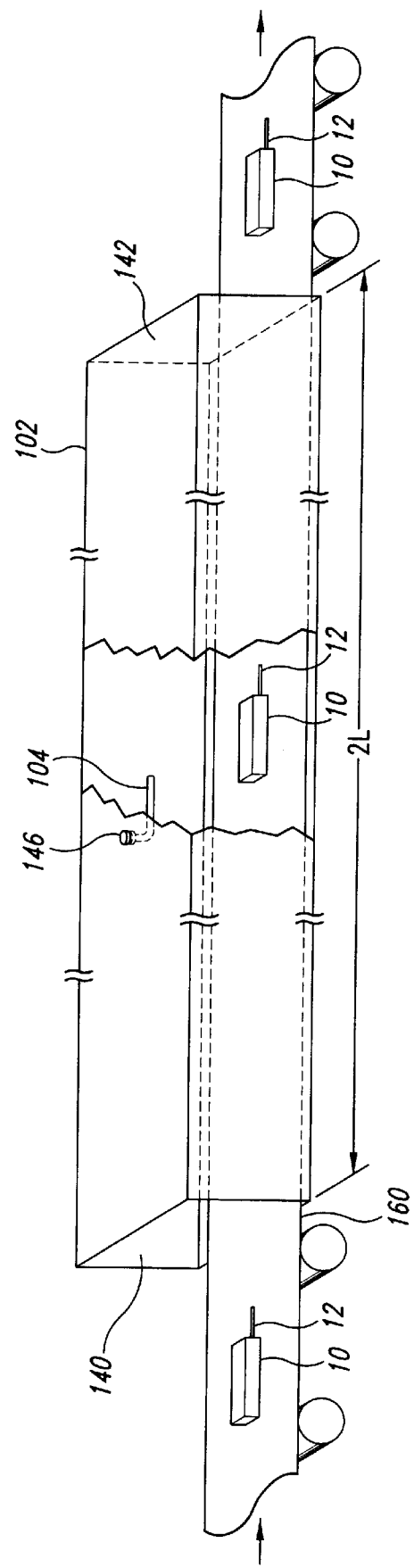
FIG. 5B is a fragmentary perspective view of an alternative embodiment of the waveguide of FIG. 5A.

In yet another alternative embodiment shown in FIG. 5B, the waveguide 102 has both the first end 140 and the second end 142 open. The length of the waveguide is approximately twice the length of a similarly constructed closed ended waveguide. For example, the rectangular waveguide illustrated in FIG. 5A can be implemented in a double length version, illustrated in FIG. 5B, wherein the first end 140 and the second end 142 are both open. In this embodiment, the aperture 146 is located in a center portion of the waveguide 102 located between the first and second ends. The center portion of the waveguide 102 of FIG. 5B is an active portion of the waveguide and is in approximately the lengthwise center of the waveguide 102 where the antenna 104 is located. In operation, the wireless communication device is inserted into the waveguide 102 near the center portion and in proximity with the antenna 104. Thus, the wireless communication device 10 is located in the active portion of the waveguide and is thus able to communicate with the antenna 104. The RF signal is attenuated so that little or no RF leakage occurs at the first end 140 or the second end 142 even though they are open. The advantage of the embodiment illustrated in FIG. 5B is that the testing of wireless communication devices may be highly automated. Rather than placement of individual wireless communication device within the waveguide 102 using the insertion tool 150 as shown in FIG. 4C, the embodiment illustrated in FIG. 5B permits automatic testing of wireless communication devices while on a conveyor belt 160 which carries the wireless communication devices into and out of the waveguide. The wireless communication device 10 may be automatically transported on the conveyor belt 160 through the interior portion of the waveguide 102 to the center portion of the waveguide near the antenna 104. The conveyor belt 160 of FIG. 5B carries the wireless communication devices thereon into the interior portion of the waveguide 102 through the open first end 140. The conveyor belt 160 is halted temporarily if needed to provide sufficient time to test the wireless communication device 10 on the conveyor belt 160 located in proximity with the antenna 104. By designing the waveguide 102 with appropriate length, additional wireless communication devices 10 on the conveyor belt 160 located outside the waveguide 102 are unaffected by RF signals between the antenna 104 and the antenna 12 of the wireless communication device within the waveguide. Following the test procedure, the conveyor belt 160 is restarted to transport the wireless communication device 10 that was tested out of the waveguide through the open second end 142 and to transport the next wireless communication device on the conveyor belt into the waveguide through the open first end 140 and to the central portion of the waveguide near the antenna 104. As can be appreciated, this is a highly automated process that permits rapid, fully automatic testing of multiple wireless communication devices in a simplified fashion. While FIG. 5B illustrates a rectangular embodiment of the waveguide 102 with the open first end 140 and open second end 142, a circular embodiment of the waveguide 102 may also be implemented with both the first and second ends 140 and 142 open.

The system 100 provides improved techniques for testing wireless communication devices. Various forms, shapes, and materials may be used for the waveguide 102 to analyze the performance of the wireless communication device 10 therein. As previously discussed, one application of the system 100 is to collect transmission characteristics for use in developing a fingerprint to be used in the subsequent identification of a particular wireless communication device. In this aspect of the system 100, the wireless communication device 10 is placed within the waveguide 102 near the antenna 104 and a number of transmission responses are elicited from the wireless communication device by the processor 120. At a subsequent time, transmission characteristics from an unauthenticated wireless communication device are captured and compared with the stored fingerprint to determine if the authenticated device is the wireless communication device from which the fingerprint was originally collected. One such system for adaptively comparing waveforms is discussed in U.S. patent application Ser. No. 08/611,429, entitled "Adapted Waveform Matching for use in Transmitter Identification", filed on Mar. 6, 1996, which is incorporated herein by reference in its entirety. Another technique for the identification of wireless communication devices is described in U.S. patent application Ser. No. 08/807,794, entitled "System and Method for Detection of Fraud in a Wireless Telephone System," filed on Feb. 28, 1997, which is incorporated herein by reference in its entirety.

In addition to performance testing and collection of transmission characteristics to establish a fingerprint, the system 100 may also be readily used to perform programming of a wireless communication device. For example, if the wireless communication device 10 is a cellular telephone, the system 100 may be used to perform initial programming of the cellular telephone. This is especially useful if the system 100 is located in a cellular telephone retail store, manufacturing facility, or the like.

Figure 6A:
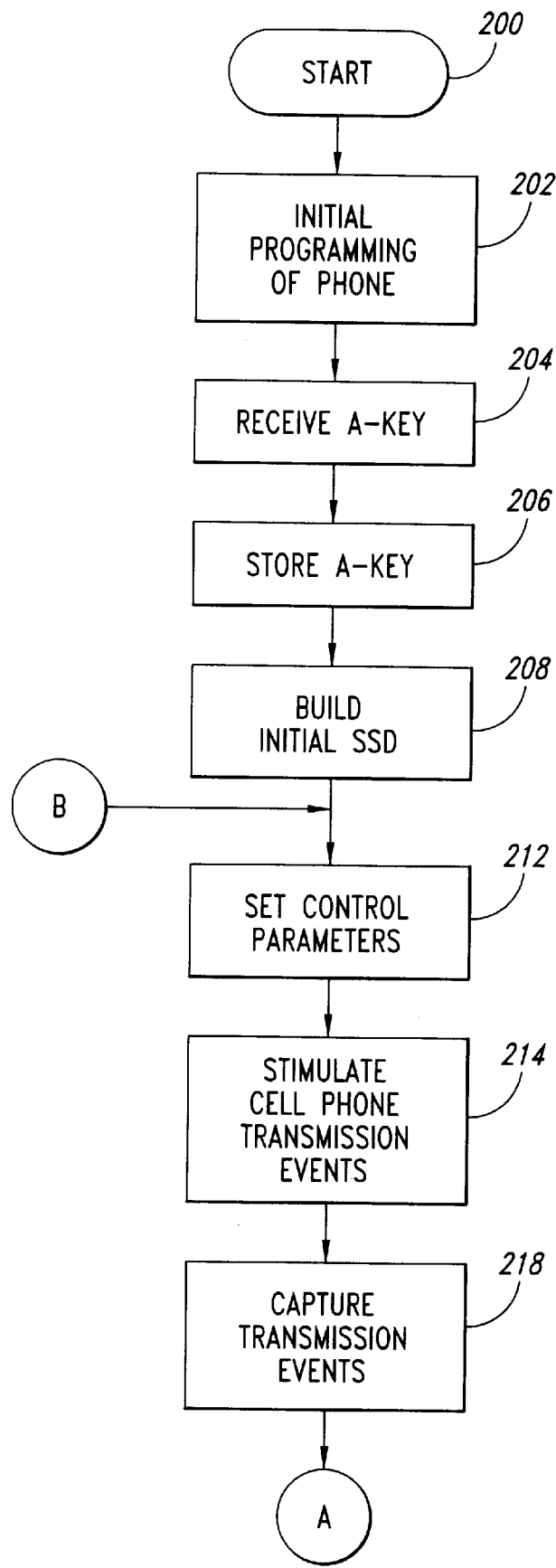
FIGS. 6A and 6B together are a flowchart of the operation of the system of FIG. 3.
Figure 6B:
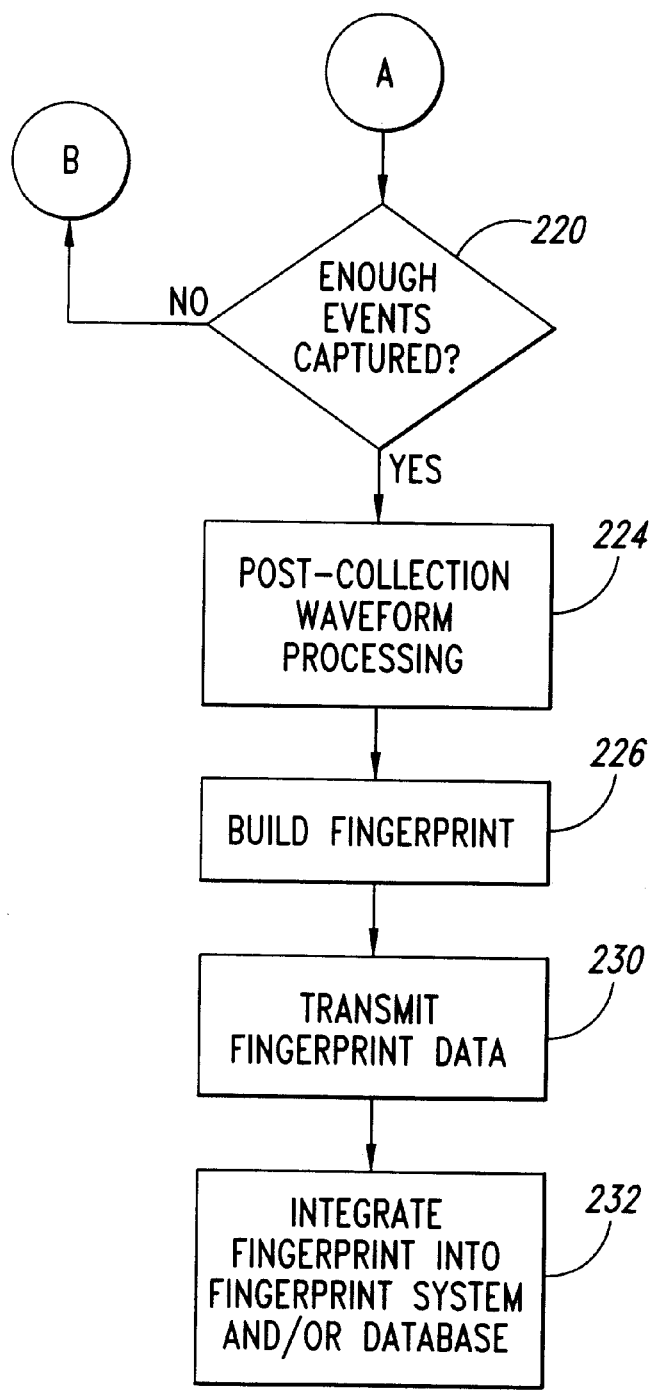

With the various system components having been described, the operation of the system 100 will now be described in greater detail. The operation of the system 100 is illustrated in the flowchart of FIGS. 6A and 6B. Although the following description is provided with respect to a cellular telephone, it is clear that many of the steps may be implemented for any form of wireless communication device. Thus, the present invention is not limited to the testing of cellular telephones. At a start 200, in FIG. 6A, the wireless communication device 10 has been placed in the waveguide 102 near the antenna 104. In step 202, the system 100 performs an initial programming of the wireless communication device 10. For example, the electronic serial number (ESN) for a cellular telephone is assigned at the factory when the telephone is manufactured. However, other parameters, such as the mobile identification number (MIN), are typically programmed by the retailer at the time of sale. It should be noted that some cellular telephones are sold as prepackaged off-the-shelf items. These off-the-shelf cellular telephones have been preprogrammed in what is known as a "pre-staging" procedure. If the cellular telephone has been pre-staged, step 202 may be omitted.

For cellular telephones that have not been pre-staged, the system 100 can perform initial programming of the cellular telephone. This initial programming step 202 may include programming of the number assignment module (NAM). As those skilled in the art can appreciate, the NAM includes assignment of the MIN, lock-out capability, A/B operating preferences and the like. If the system 100 performs initial programming of the cellular telephone in step 202, the display 126 (see FIG. 3) is a conventional video display, while the user input device 128 is a keyboard, mouse, trackball, touch-sensitive screen, or the like.

The system 100 may also be used to program an authentication key (A-KEY) into the cellular telephone. The A-KEY is programmed into the cellular telephone and is used in a "challenge and reply" authentication system. With the challenge and reply authentication system, a central control unit (not shown) transmits a random number to the cellular telephone as a "challenge." It should be noted that the A-KEY itself is never transmitted by the central controller or the cellular telephone in normal operation. The A-KEY is used to build a shared secret data (SSD) code. The central controller issues the random number challenge using the SSD code.

The cellular telephone uses the SSD code to construct a number based on the transmitted random number and transmits the constructed number to the central controller (not shown) as a "reply." The central controller also has the A-KEY for the cellular telephone and constructs a reference number using the SSD code and the transmitted random number. If the reply transmitted by the cellular telephone does not match the reference number constructed by the central controller, the cellular telephone is considered to be an unauthorized cellular telephone.

When the system 100 is used to initially program the A-KEY into a cellular telephone, in step 204 the system 100 receives the A-KEY from the central computer system 134 via the data link 130. To assure security of the A-KEY, the data link 130 is preferably a secure land line. In step 206, the system 100 automatically programs the A-KEY into the cellular telephone while in the waveguide 102. It should be noted that it may be necessary to connect the keypad connector 36 (see FIG. 3) directly to the processor 120 using the cable 122 to enter the A-KEY into the cellular telephone. In prior art systems, the retail sales representative programs the NAM into the cellular telephone at the time of sale. It is known that theft of ESN, MIN and the A-KEY by retail sales representatives is a significant source of illegally obtained codes. The system 100 provides greater security for the A-KEY and MIN because this data is never revealed to the retailer who is selling the cellular telephone.

In step 208, the system builds the initial SSD code. Both the A-KEY and the SSD code are stored within the memory 32 (see FIG. 2) of the cellular telephone. It should be noted that steps 204–208 may be omitted if the cellular telephone is already programmed with the A-KEY, or if the cellular telephone is an older design that does not have A-KEY capability.

In step 212, the processor 120 (see FIG. 3) sets the control parameters for the reference waveform gathering procedure. Many of the control parameters have been previously discussed and will not be discussed in greater detail herein. The control parameters may include the carrier frequency on which the transmitter 108 and receiver 110 operate, the power level of the transmitter, and the transmission power level of the transmitter 16 (see FIG. 2) in the cellular telephone.

In step 214, the system stimulates telephone transmission events from the cellular telephone while in the waveguide 102. If the system 100 is being used to test the cellular telephone, data such as transmission frequency, power output, modulation index, and the like can be monitored to determine the functionality of the cellular telephone. If the system 100 is being used to establish a fingerprint for the cellular telephone, it is preferable that a sufficient number of telephone transmission events are stimulated to develop a reliable fingerprint for the cellular telephone.

Figure 2:
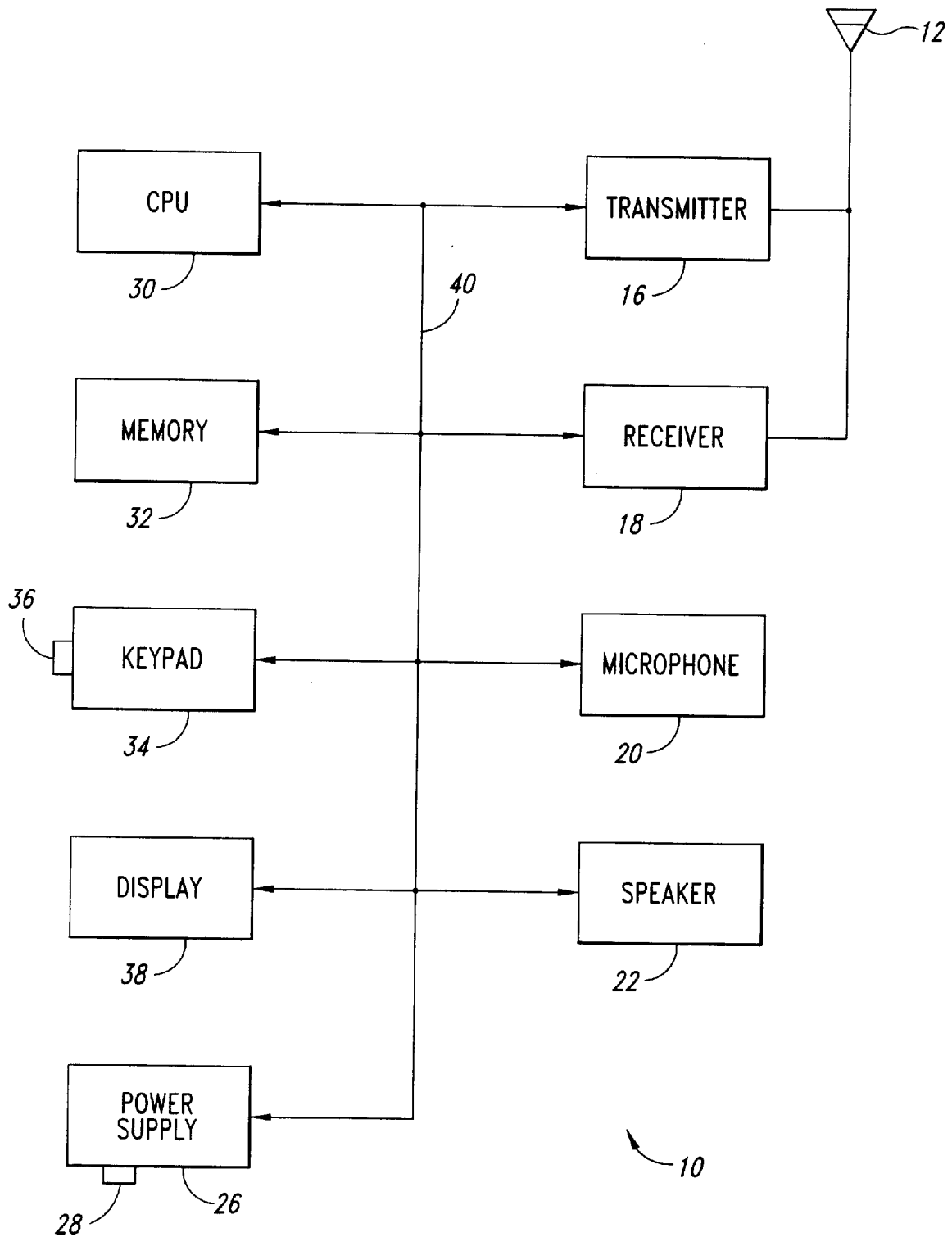
FIG. 2 is a functional block diagram of a conventional wireless communication device.

In addition, the processor 120 can stimulate telephone transmission events from the cellular telephone in the waveguide 102 by sending commands through the keypad connector 36 (see FIG. 2). For example, the processor 120 can send commands to the cellular telephone via the keypad connector 36 to cause the cellular telephone to place a phone call. Thus, the present invention is not limited by the particular technique used to stimulate the cellular telephone transmission event.

In step 218, the system 100 captures the transmission events. A number of different transmission events are known to be useful in verifying proper operation of the cellular telephone and authenticating a particular cellular telephone. For example, transient response waveforms, such as those discussed in U.S. patent Ser. No. 08/500,5210, issued to "Ferrell" on Apr. 2, 1991, or radio frequency signature characteristics, such as discussed in U.S. patent Ser. No. 08/542,0910, issued to "Rudokas et al." on May 30, 1995, can be used to positively identify a valid cellular telephone or a fraudulent cellular telephone. Other types of transmission characteristics are also known in the art and need not be described herein. The present invention is not limited by the specific transmission events that are used to verify the operation of the cellular telephone or extract reference waveforms to establish a fingerprint.

In decision 220, shown in FIG. 6B, the system 100 determines whether a sufficient number of transmission events have been captured to verify proper operation of the cellular telephone or develop a reliable fingerprint for the cellular telephone in the waveguide 102. It should be noted that each transmission event can result in the capture of one or more reference waveforms. A number of different techniques can be used to determine whether a sufficient number of transmission events have been captured. In a simple approach, the system 100 captures a fixed number of transmission events. Alternatively, the processor 120 can analyze the captured transmission characteristics and collect a sufficient number until a variance between transmission events is below a predetermined threshold variance. In yet another alternative embodiment, the transmission events may be used by the system 100 to progressively develop the fingerprint. The processor 120 compares the developed fingerprint with a representative finger print database to assure that the fingerprint of the cellular telephone within the waveguide 102 can be distinguished from the representative fingerprints in the fingerprint database. If the system 100 is able to distinguish the fingerprint developed so far from the cellular telephone in the waveguide 102 from the finger prints in the database, then enough events have been captured.

If enough reference waveforms have not been captured, the resulted decision 220 is NO. In that case, the system 100 returns to step 214, in FIG. 6A, to collect additional transmission events. Alternatively, the system 100 may return to step 212, in FIG. 6A, to set control parameters and then collect additional transmission events in step 214. As discussed above, the system 100 may alter the control parameters to collect a variety of transmission events using different parameter settings for the transmitter 108, the receiver 110, the transmitter 16 and receiver 18 (see FIG. 2) of the wireless communication device 10 in the waveguide 102.

If enough transmission events have been captured, the result of decision 220 is YES. In that case, in step 224, the system performs post-processing on the transmission events. For example, the system 100 can collect a large number of transmission events and then analyze each reference waveform before actually processing the waveform into the fingerprint. The analysis may reveal, for example, that one reference waveform has an unacceptably high variance compared with the remaining waveforms. In step 224, the particular reference waveform with the high variance may be deleted before generating the fingerprint.

In step 226, the processor 120 (see FIG. 3) can process the captured reference waveforms to build the fingerprint. Alternatively, the processor 120 can transmit the captured reference waveforms directly to the central computer system 134 via the data link 130 to permit the fingerprint to be constructed by the central computer system. The present invention is intended to encompass the construction of the fingerprint locally by the processor 120, remotely by the central computer system 134 or otherwise.

In step 230, the system 100 transmits the fingerprint data to the central computer system 134 for integration into a fingerprint system or a fingerprint database. As previously discussed, the transmission of fingerprint data may be of processed reference waveforms, or the fingerprint data itself. The process ends at step 232 with the integration of the fingerprint into a fingerprint system or database. Thus, the system 100 can collect a number of transmission events under controlled conditions to develop an accurate fingerprint of the cellular telephone in the waveguide 102. With the system 100, it is possible to collect transmission events under a variety of conditions and to develop an extremely accurate fingerprint.

It should be noted that the flowchart of FIGS. 6A and 6B illustrate one method of operation for the system 100. However, as previously discussed, the system 100 may be used to perform testing and analysis of virtually any wireless communication device and it is not limited only to cellular telephones. In addition, the flowchart of FIGS. 6A and 6B may include many optional and alternative steps. As previously discussed, the steps 202–208 may be omitted if the cellular telephone is already programmed. The system 100 can be used to collect transmission events from a pre-programmed cellular telephone as well as simplifying the initial-setup of an unprogrammed cellular telephone in the manner described above. In addition, the steps 224 and 226 may be performed by the processor 120 (see FIG. 3) or by the central computer system 134. Those skilled in the art will understand that the sequence of steps illustrated in the flowchart of FIGS. 6A and 6B will vary depending on the particular portion of the system 100 that processes the transmission events and generates the fingerprint. For example, the step 230 may occur before steps 224 and 226 if the unprocessed transmission events are transmitted to the central computer system 134 for processing. Similarly, the processor 120 may progressively build the fingerprint while capturing additional transmission events in the sequence of steps 212–220. In this embodiment, the steps 224 and 226 of processing and building the fingerprint occur within the above described loop of steps 212–220.

The system 100 is extremely small in physical size and can be readily used at retail outlets to program and test the wireless communication devise 10 and to collect reference waveforms under controlled conditions. The system 100 may also be used in a mobile setting to analyze transmission characteristics and collect transmission waveforms from the wireless communication device 10 already in use by subscribers without requiring the subscriber to bring his cellular telephone to a retail outlet, which may be inconvenient. The system 100 allows quick and efficient analysis of the wireless communication device 10 while in the waveguide 102.

It is to be understood that even though various embodiments and advantages of the present invention have been set forth in the forgoing description, the above disclosure is illustrative only, and changes may be made in detail, yet remain within the broad principles of the invention. Therefore, the present invention is to be limited only by the appended claims.

What is claimed is:

1. A system for the collection of transmission characteristics from a transmitter of a wireless communication device, the system comprising:

a waveguide with an interior portion sized to accept the wireless communication device at a test position therein and having physical dimensions such that the waveguide is beyond cutoff at frequencies used for communication with the wireless communication device;

a transmitter operable at frequencies used for communication with the wireless communication device, said transmitter transmitting signals to the wireless communication device when positioned at said test position;

a receiver operable at frequencies used for communication with the wireless communication device, said receiver receiving signals from the wireless communication device when positioned at said test position and generating receiver output signals representative of said received signals;

an antenna coupled to said transmitter and said receiver and extending into said waveguide interior portion in proximity with said test position, said antenna coupling radio frequency signals transmitted by said transmitter to the wireless communication device when positioned at said test position and coupling radio frequency signals transmitted from the wireless communication device when positioned at said test position to said receiver; and a processor to control said transmitter and cause said transmitter to transmit signals to said antenna for coupling to the wireless communication device when at said test position, said processor receiving said receiver output signals representative of said received signals from the wireless communication device when at said test position.

2. The system of claim 1 wherein said waveguide is a circular waveguide having a radius selected to assure waveguide operation beyond cutoff at frequencies used for communication with the wireless communication device and a length selected to attenuate radio frequency signals at frequencies used for communication with the wireless communication device by a predetermined amount.

3. The system of claim 1 wherein said waveguide is a rectangular waveguide having a cross-sectional area selected to assure waveguide operation beyond cutoff at frequencies used for communication with the wireless communication device and a length selected to attenuate radio frequency signals at frequencies used for communication with the wireless communication device by a predetermined amount.

4. The system of claim 1 wherein said waveguide has first and second ends, said first end being enclosed and said second end being open, said test position being located in proximity with said second end.

5. The system of claim 1 wherein said waveguide has a continuously open first end to permit the insertion and removal of the wireless communication device into said waveguide at said test position and a closed second end, said test position being located in proximity with said second end.

6. The system of claim 5, further including an insertion tool having sufficient length to carry the wireless communication device for insertion into said waveguide at said test position and removal from said waveguide.

7. The system of claim 6 wherein said insertion tool is constructed from a non-metallic material.

8. The system of claim 1 wherein said waveguide has first and second ends, said first and second ends being open.

9. The system of claim 8 wherein said antenna extends into said waveguide interior portion in proximity with said test position at a location between said first and second open ends.

10. The system of claim 8 wherein said antenna extends into said waveguide interior portion in proximity with said test position at a location substantially halfway between said first and second open ends.

11. The system of claim 8, further including a transport member to transport the wireless communication device into said first open end into said test position and to transport the wireless communication device from said test position out said second open end.

12. The system of claim 1 wherein said waveguide has first and second open ends and said waveguide physical dimensions include a waveguide length that is approximately two times that which is required to assure waveguide operation beyond cutoff at frequencies used for communication with the wireless communication device.

13. The system of claim 12 wherein said antenna extends into said waveguide interior portion in proximity with said test position at a location substantially halfway between said first and second open ends.

14. The system of claim 1 wherein said processor selectively controls operational parameters of said transmitter to control said transmitter transmit signals during transmission to the wireless communication device when positioned at said test position and selectively controls said receiver when receiving said signals from the wireless communication device when positioned at said test position.

15. The system of claim 1 wherein said processor processes said receiver output signals indicative of a transmission characteristic of the wireless communication device when positioned at said test position to generate a fingerprint associated with said transmission characteristic.

16. The system of claim 15 wherein said processor stores said fingerprint for subsequent use in the authentication of the wireless communication device when used outside of said waveguide.

17. The system of claim 1, further including a computer system coupled to said processor and receiving said receiver output signals from said processor, said computer system processing said receiver output signals indicative of said transmission characteristic of the wireless communication device when positioned at said test position to generate a fingerprint associated with said transmission characteristic.

18. The system of claim 17 wherein said computer system stores said fingerprint for subsequent use in the authentication of the wireless communication device when used outside of said waveguide.

19. A system for testing a wireless communication device, the system comprising:

a waveguide with an interior portion sized to accept the wireless communication device at a test position therein and having physical dimensions such that the waveguide is beyond cutoff at frequencies used for communication with the wireless communication device;

a system communication device operable at frequencies used for communication with the wireless communication device when positioned at said test position; and a signal coupler coupled between said system communication device and said waveguide interior portion in proximity with said test position to communicate with the wireless communication device when positioned at said test position.

20. The system of claim 19 wherein said system communication device includes a transmitter and said signal coupler includes a transmitter antenna coupled to said transmitter and extending into said waveguide interior portion in proximity with said test position, said transmitter antenna coupling radio frequency signals transmitted by said transmitter to the wireless communication device when positioned at said test position.

21. The system of claim 20, further including a processor to control said transmitter and cause said transmitter to transmit radio frequency signals to said wireless communication device when positioned at said test position.

22. The system of claim 20, further including a receiver operable at frequencies used for communication with the wireless communication device and coupled to a receiver antenna, said receiver antenna coupling radio frequency signals transmitted from the wireless communication device when positioned at said test position to said receiver, said receiver receiving signals from the wireless communication device when positioned at said test position and generating receiver output signals representative of said received signals.

23. The system of claim 22 wherein said transmitter antenna and said receiver antenna are a common antenna.

24. The system of claim 20, further including a processor to control said transmitter and cause said transmitter to transmit radio frequency signals to the wireless communication device when positioned at said test position and a receiver operable at frequencies used for communication with the wireless communication device, said receiver receiving signals from the wireless communication device when positioned at said test position and generating receiver output signals representative of said received signals, said processor receiving said receiver output signals.

25. The system of claim 19 wherein said waveguide is a circular waveguide having a radius selected to assure waveguide operation beyond cutoff at frequencies used for communication with the wireless communication device and a length selected to attenuate radio frequency signals at frequencies used for communication with the wireless communication device by a predetermined amount.

26. The system of claim 19 wherein said waveguide is a rectangular waveguide having a cross-sectional area selected to assure waveguide operation beyond cutoff at frequencies used for communication with the wireless communication device and a length selected to attenuate radio frequency signals at frequencies used for communication with the wireless communication device by a predetermined amount.

27. The system of claim 19 wherein said waveguide has first and second ends, said first end being enclosed and said second end being open, said test position being located in proximity with said second end.

28. The system of claim 27, further including an insertion tool having sufficient length to carry the wireless communication device for insertion into said waveguide at said test position and removal from said waveguide.

29. The system of claim 19 wherein said waveguide has first and second ends, said first and second ends being open.

30. The system of claim 29 wherein said signal coupler includes an antenna extending into said waveguide interior portion in proximity with said test position at a location between said first and second open ends.

31. The system of claim 30 wherein said antenna extends into said waveguide interior portion in proximity with said test position at a location substantially halfway between said first and second open ends.

32. The system of claim 29, further including a transport member to transport the wireless communication device into said first open end into said test position and to transport the wireless communication device from said test position out said second open end.

33. The system of claim 19 wherein said waveguide has first and second open ends and said waveguide physical dimensions include a waveguide length that is approximately two times that which is required to assure waveguide operation beyond cutoff at frequencies used for communication with the wireless communication device.

34. A system for testing a wireless communication device, the system comprising:

a waveguide having first and second ends and an interior portion sized to accept the wireless communication device at a test position therein, said waveguide having a cross-sectional area selected to assure waveguide operation beyond cutoff at frequencies used for communication with the wireless communication device and a length selected to attenuate radio frequency signals at frequencies used for communication with the wireless communication device by a predetermined amount;

a transmitter operable at frequencies used for communication with the wireless communication device, said transmitter transmitting signals to the wireless communication device when positioned at said test position;

a receiver operable at frequencies used for communication with the wireless communication device, said receiver receiving signals from the wireless communication device when positioned at said test position and generating receiver output signals representative of said received signals; and an antenna coupled to said transmitter and said receiver and extending into said waveguide interior portion in proximity with said test position, said antenna coupling radio frequency signals transmitted by said transmitter to the wireless communication device when positioned at said test position and coupling radio frequency signals transmitted from the wireless communication device when positioned at said test position to said receiver, whereby said waveguide prevents signals transmitted from the wireless communication device positioned at said test position from being detected by said receiver via signals transmitted from said first and second waveguide ends and prevents signals transmitted by said transmitter from being detected by from the wireless communication device positioned at said test position via signals transmitted into said first and second waveguide ends.

35. A method for testing a wireless communication device, the method comprising the steps of:

inserting the wireless communication device into an interior portion of a waveguide sized to accept the wireless communication device at a test position therein and having physical dimensions such that the waveguide is beyond cutoff at frequencies used for communication with the wireless communication device;

communicating with the wireless communication device when positioned at said test position using frequencies used for communication with the wireless communication device; and coupling signals between a system communication device and said waveguide interior portion in proximity with said test position to communicate with the wireless communication device when positioned at said test position.

36. The method of claim 35 wherein the steps of communicating with the wireless communication device and coupling signals between the system communication device and the wireless communication device when positioned at said test position includes the steps of transmitting signals from the system communication device through a transmitter antenna to the wireless communication device when positioned at said test position.

37. The method of claim 35 wherein the steps of communicating with the wireless communication device and coupling signals between the system communication device and the wireless communication device when positioned at said test position includes the steps of receiving signals transmitted from the wireless communication device when positioned at said test position using a receiver antenna and providing said received signals to a receiver operable at frequencies used for communication with the wireless communication device.

38. The method of claim 37 wherein said transmitter antenna and said receiver antenna are a common antenna.

39. The method of claim 35 wherein said waveguide is a circular waveguide having a radius selected to assure waveguide operation beyond cutoff at frequencies used for communication with the wireless communication device and a length selected to attenuate radio frequency signals at frequencies used for communication with the wireless communication device by a predetermined amount.

40. The method of claim 35 wherein said waveguide is a rectangular waveguide having a cross-sectional area selected to assure waveguide operation beyond cutoff at frequencies used for communication with the wireless communication device and a length selected to attenuate radio frequency signals at frequencies used for communication with the wireless communication device by a predetermined amount.

41. The method of claim 35 wherein said waveguide has first and second ends, said first end being enclosed and said second end being open, said test position being located in proximity with said second end.

42. The method of claim 35 wherein said step of inserting includes the use of an insertion tool having sufficient length to carry the wireless communication device for insertion into said waveguide at said test position and removal from said waveguide.

43. The method of claim 35 wherein said waveguide has first and second ends, said first and second ends being open.

44. The method of claim 43 wherein said step of coupling uses an antenna extending into said waveguide interior portion in proximity with said test position at a location between said first and second open ends.

45. The method of claim 43 wherein said step of coupling uses an antenna extending into said waveguide interior portion in proximity with said test position at a location substantially halfway between said first and second open ends.

46. The method of claim 35 wherein said step of inserting uses a transport member to transport the wireless communication device into said first open end into said test position and to transport the wireless communication device from said test position out said second open end.

47. The method of claim 35 wherein said waveguide has first and second open ends and said waveguide physical dimensions include a waveguide length that is approximately two times that which is required to assure waveguide operation beyond cutoff at frequencies used for communication with the wireless communication device.

* * * * *